United States Patent [19]

Beans

[11] Patent Number: 5,711,549
[45] Date of Patent: Jan. 27, 1998

[54] HIGH PRESSURE QUICK CONNECT FOR USE IN AUTOMOTIVE BRAKE SYSTEM APPLICATION

[75] Inventor: Bruce A. Beans, Waterford, Mich.

[73] Assignee: ITT Automotive, Inc., Auburn Hills, Mich.

[21] Appl. No.: 475,945

[22] Filed: Jun. 7, 1995

[51] Int. Cl.[6] ............................................ F16L 35/00
[52] U.S. Cl. .................... 285/93; 285/305; 285/334.5
[58] Field of Search ................... 285/93, 305, 334.5; 29/512

[56] References Cited

U.S. PATENT DOCUMENTS

| 2,749,151 | 6/1956 | Lyons | 285/305 |
|---|---|---|---|
| 3,127,199 | 3/1964 | Roe | 285/305 |
| 3,278,206 | 10/1966 | Woodling | 285/334.5 |
| 3,404,904 | 10/1968 | Roe | 285/305 |
| 3,534,988 | 10/1970 | Lindsey | 285/305 |
| 3,786,730 | 1/1974 | Linderholm | 29/512 |
| 4,401,326 | 8/1983 | Blair . | |
| 4,423,891 | 1/1984 | Menges | 285/305 |
| 4,598,937 | 7/1986 | Sugau | 285/334.3 |
| 4,725,081 | 2/1988 | Bauer | 285/305 |
| 4,893,657 | 1/1990 | Usui | 285/333 |
| 5,178,424 | 1/1993 | Klinger . | |
| 5,207,462 | 5/1993 | Bartholomew . | |
| 5,275,443 | 1/1994 | Klinger . | |
| 5,275,448 | 1/1994 | McNaughton et al. . | |
| 5,335,411 | 8/1994 | Muller et al. | 29/512 |
| 5,374,089 | 12/1994 | Davie et al. . | |
| 5,378,025 | 1/1995 | Szabo . | |
| 5,415,443 | 5/1995 | Hayashi | 29/512 |

FOREIGN PATENT DOCUMENTS

| 233336 | 5/1964 | Austria | 285/305 |
|---|---|---|---|
| 0275815 | 7/1988 | European Pat. Off. . | |
| 2346628 | 10/1977 | France . | |
| 2143714 | 3/1973 | Germany | 285/305 |
| 3416702 | 11/1985 | Germany . | |
| 37396269 | 6/1989 | Germany | 281/305 |
| 9305916 | 7/1993 | Germany . | |
| 4427597 | 2/1996 | Germany . | |
| 4427598 | 2/1996 | Germany . | |
| 170337 | 10/1921 | United Kingdom | 29/512 |

OTHER PUBLICATIONS

BMW drawing, 1990.

*Primary Examiner*—Eric K. Nicholson
*Attorney, Agent, or Firm*—Thomas N. Twomey; J. Gordon Lewis

[57] ABSTRACT

A high pressure quick connector is disclosed for use in connecting brake lines of a vehicle, particularly to a brake junction for an anti-lock brake system. The connector includes a housing for receiving a tube retainer. The tube retainer has a lower cylindrical portion that is positively attached to enclose a flared end form to provide a fluid seal. Retaining means in the form of a snap ring works in conjunction with a pop top to provide a low force and a positive insertion indicator. The snap ring has ears that are compressed together and inserted up inside a slot in the pop top. Upon installation of the tube retainer and retaining means into a central bore of the housing, an end portion of the housing makes contact with the pop top so that the pop top slides up the tube. As the pop top slides up the tube, the snap ring ears are released from the pop top slot. The snap ring expands upon release into a final latching position with the housing and tube retainer.

18 Claims, 2 Drawing Sheets

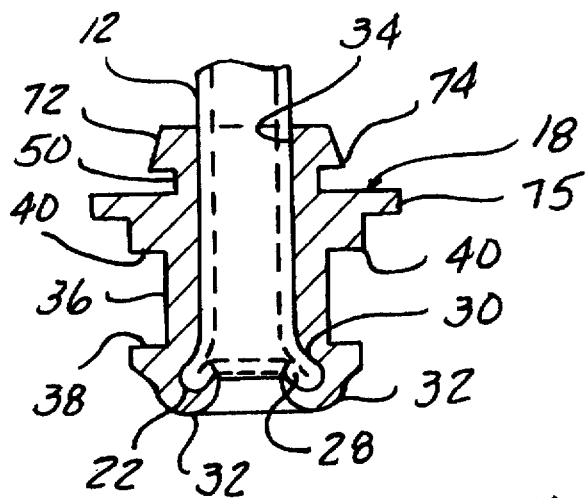
FIG·3
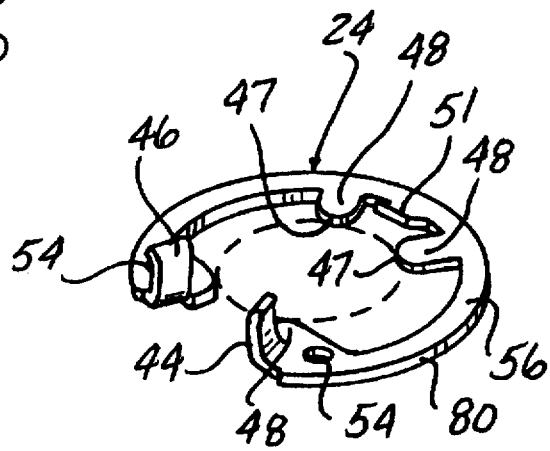
FIG·4
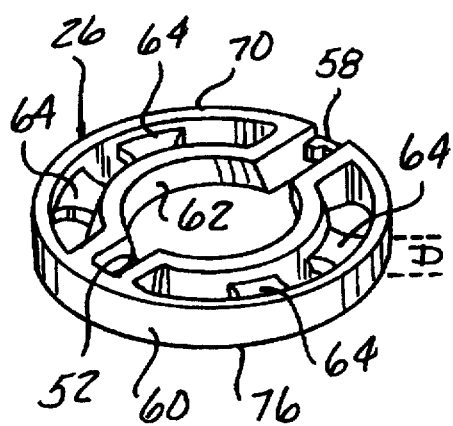
FIG·5
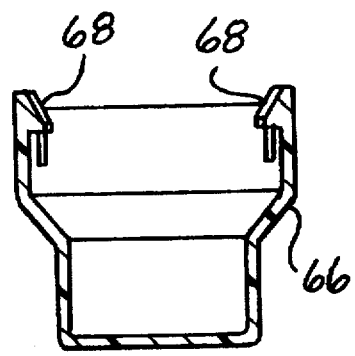
FIG·6
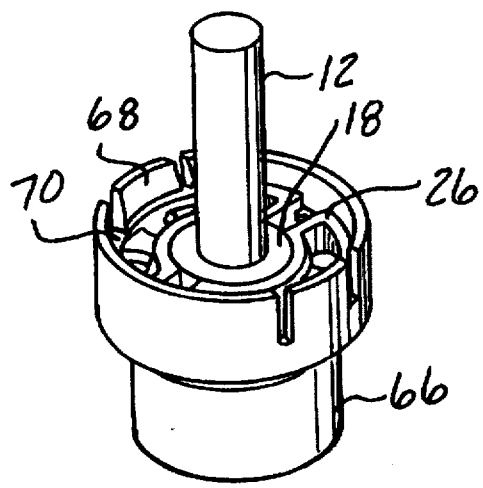
FIG·7

5,711,549

HIGH PRESSURE QUICK CONNECT FOR USE IN AUTOMOTIVE BRAKE SYSTEM APPLICATION

FIELD OF THE INVENTION

The present invention relates to a high pressure snap fit or quick connector employed on fluid conduit systems and more particularly for vehicle brake lines.

BACKGROUND OF THE INVENTION

Snap fit or quick connectors have been found to be useful in a wide range of applications. In particular, they are frequently employed for joining fluid carrying conduits in automotive and industrial applications. Such connectors have found general acceptance as they are typically capable of being closed in a single uni-axial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system.

In applications where hazardous material is to flow through a fitting, for example, in vehicle brake lines, prevention of inadvertent release of the quick connector is of primary concern. Accordingly, relatively high axial pull apart strength specifications are mandated. In addition, low insertion forces are required.

Currently, for many high pressure applications, such as with brake lines, threaded fittings are used as connection means. If not aligned correctly, cross threaded may result. If excessive torque is applied, over threading may result. As a result of cross-threading or overthreading, the threads are stripped and the material must be scrapped and replaced.

In current anti-lock brake systems, the brake lines are connected to a brake manifold or junction during the assembly process of the vehicle. The threaded connections of the prior art are located close together which increases assembly time and labor as well as the potential for error.

Therefore, it is desirable of the invention to provide a quick connect for high pressure automotive system applications and particularly for brake systems which facilitate assembly of the quick connect so that it is easier and quicker. It is also desirable to provide a quick connector for high pressure fluids that provide high axial pull apart strength and low insertion forces specifications. It is further desirable to provide a connector that eliminates the threaded connection to reduce scrap as a result of cross-threading. In addition, it is desirable to provide a connector in a compact package such that the current tube nuts can be replaced with a quick connector so that six brake lines can have a connection point on a single brake manifold. It is finally desirable of this invention to provide an improved quick connect having a positive seal around the brake line end, and which provides minimum volumetric displacement, low diametrical clearances and sealing durability.

SUMMARY OF THE INVENTION

The present invention addresses the aforementioned concerns and provides a connector which has a high pull out force, exceeding 500 pounds at a rate of 50.8 mm/min., while having a low insertion force not exceeding 25 pounds. The present invention further provides a quick connector that is sized to replace the current tube nuts for a brake manifold. The quick connector of the present invention provides a male connector and a female connector. The male connector has a locking and retaining assembly that receives a brake line having a flared end portion. The retaining means provides a groove for receiving and securing a locking means once the locking means is installed on the retaining means. The retaining means further by its formation of its lower portion over and enclosing the flared end of the brake line provides a positive attachment to the brake line as well as a fluid seal.

The locking means in the form of a snap ring having longitudinally extending ears works in conjunction with a pop top such that the male connector assembly can be delivered to the assembly facility in a protective cover, wherein the snap ring ears are compressed together and are inserted upward inside a slot within the pop top. Upon delivery, the protective cover is removed and the male quick connect assembly is inserted into a receiving bore of the female connector. During insertion into the receiving bore, the pop top makes contact with an outer surface of the female connector. As the male quick connect assembly is further inserted, the pop top is forced to move longitudinally up the brake line tube as it is separated from the snap ring. As the pop top is separated from the snap ring, the snap ring ears slide out of the slot in the pop top, and the snap ring expands into the annular channel of the receiving bore. The annular channel has a dimension to correspond with the height of the snap ring such that when the snap ring is released in the annular channel, axial movement of the male connection in the receiving bore is essentially eliminated.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a cross-sectional view of a retaining means formed over a brake line end form;

FIG. 4 is a perspective view of a snap ring retainer;

FIG. 5 is a perspective view of a pop top;

FIG. 6 is a cross-sectional view of a delivery cover; and

FIG. 7 is a perspective view of the male quick connect assembly configuration for transport.

DESCRIPTION OF THE PREFERRED EMBODIMENT

Figure 2:
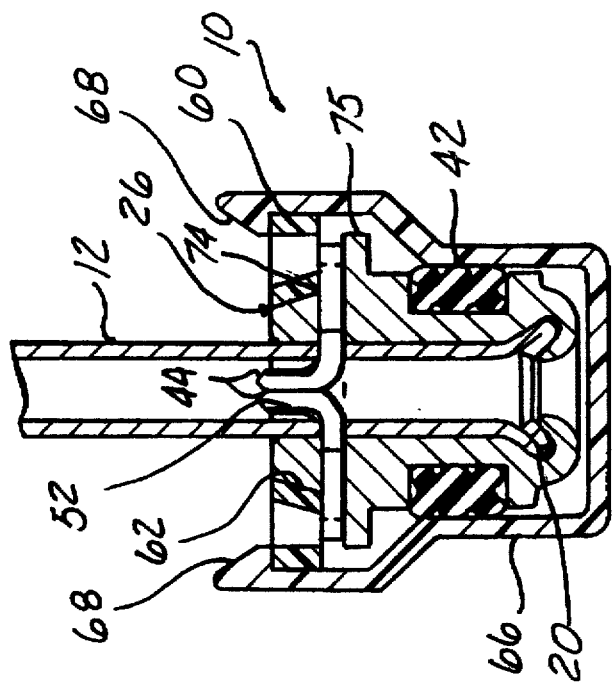
FIG. 2 is a cross-sectional view of the male quick connect assembly configuration for transport to a vehicle assembly facility.
Figure 1:
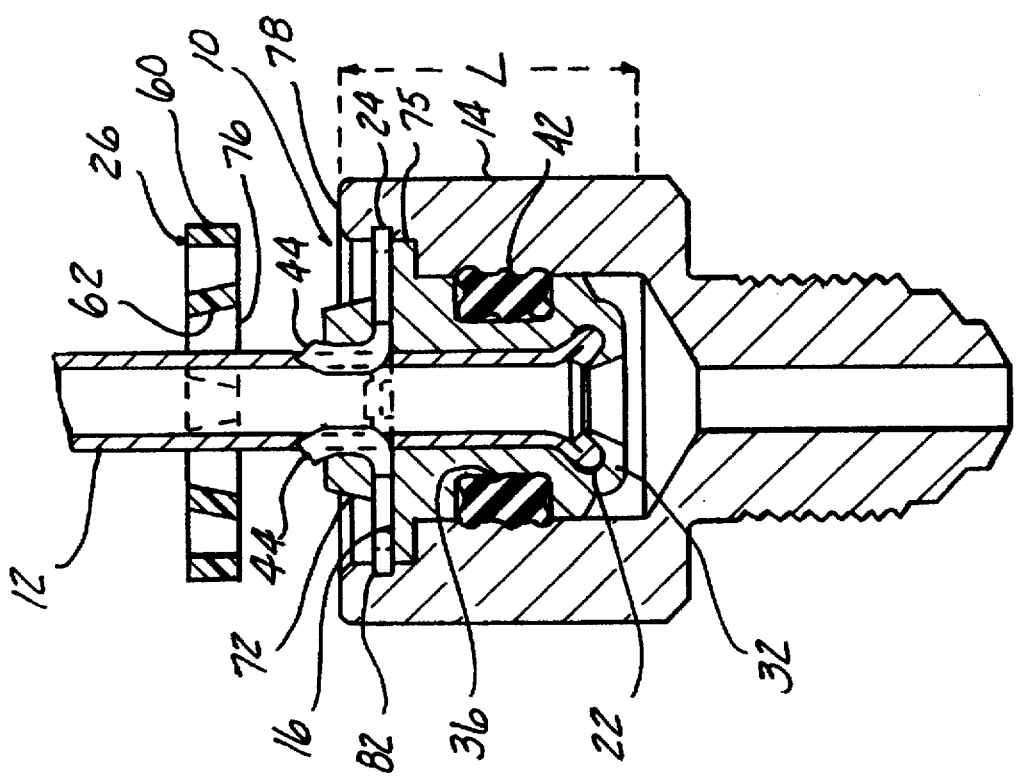
FIG. 1 is a cross-sectional view of the preferred embodiment of a male high pressure quick connect inspected in a female connector.

Looking first at FIGS. 1 and 2, the invention is a quick connector adapted for connecting a male connector 10 incorporating a tube 12, especially a brake line tube to a female connector generally indicated at 14. The female connector or housing 14 may have any applicable exterior configuration depending upon the application. FIG. 1 shows a typical housing 14 for an in-line brake tube. The housing 14 has an internal surface defining a receiving bore 16 for the male quick connector. The external configuration of the housing may change relative to the application. In an anti-lock brake system, brake lines may be connected to a housing in the form of a brake manifold or junction having multiple receiving bores 16 therein. The male quick connector and housing are not limited to the anti-lock brake system but may be used for any high pressure connection.

The male quick connector 10 includes a tube retainer 18 having a positive attachment 20 to the flared line 22 of the brake line 12. The tube retainer 18 is locked in place in the receiving bore 16 by a retaining means including a snap ring 24. A pop top 26 works in conjunction with the snap ring 24, as will be discussed in detail below. The pop top 26 and snap ring 24 allows for a low insertion force into the receiving bore 16 of connector housing 14.

FIG. 3 shows a cross-sectional view of the tube retainer 18 formed over a brake line endform 22. The tube retainer 18 has a through aperture 34 through which tube or brake line 12 passes. The end of the brake line tube 12 is flared to a standard 45° SAE J533B flare. A cylindrical lower half 28 of the end portion 22 of the flare is upturned into the tube 12 so that the lower half 28 lays flush against the upper half 30 of the flared end 22. The tube retainer 18 is positively attached to the brake line 12 by forming its lower cylindrical portion 32 over the flared end 22 of the brake line. This configuration provides a fluid tight seal that is held securely to the tube 12 in that the flared end 22 in the brake line 12 is sandwiched by the lower cylindrical portion 32 of the tube retainer 18 in the forming process. The end diameter of the male connector at the bottommost position is essentially the same as the mean diameter of the tube 12 in order to not restrict flow. The brake line tube 12 is supported and is in contact with the tube retainer 18 for approximately 10 millimeters (mm) by the inner periphery of the tube retainer defining the inner through aperture 34 to provide durability and stability from vibration loads. At a lower portion of the tube retainer 18, an exterior surface portion forms a circumferential integral recess 36 disposed between a lower ledge 38 and an upper shelf 40. The circumferential recess 36 provides a position for another sealing means 42. The sealing means 42 may include an O-ring, but preferably is a Quad-O-Dyne seal ring registered and manufactured by Minnesota Rubber, to provide a durable and redundant seal between the housing female connector and male connector. The seal ring 42 is made from an EPDM material compound, i.e. Ethylene Propylene Diene Monomer. An upper periphery 72 of the tube retainer 18 is tapered outwardly, terminating at a ledge 74. Adjacent to ledge 74, the outer periphery of the tube retainer 18 forms a groove 50. Adjacent the groove, and moving longitudinally away from ledge 74 is an extending ledge 75 having a greater diameter than ledge 74.

FIG. 4 shows a perspective view of the latching or locking mechanism 24 for the male quick connector 10. The latching mechanism 24 is in the form of a snap ring 24. The snap ring 24 is a stainless steel non-contiguous ring to allow for radial compression and radial expansion at the two ends. At each end is a longitudinally extending ear 44 having a curved vertical wall 46. The ears 44 on the snap ring 24 are used in conjunction with the pop top 26 shown in FIG. 5. The ears 44 simplify the latching and unlatching of the male connector 10 through the use of simple tools. Also, adjacent each ear 44 on the snap ring 24 is an aperture 54 through the upper surface 56 to provide a means to use standard snap ring pliers to latch and unlatch the quick connector 10. The snap ring 24 is held in compression so that the ears can be inserted inside the slot 52 in the pop top 26. Adjacent to each ear 44 and diametrically opposing the ears 44 on snap ring 24 are radially inwardly facing tabs 48 to provide engagement with the groove 50 of the tube retainer. The upper periphery 72 of tube retainer 18 is tapered outwardly to provide a smooth transitional path for the snap ring as the snap ring 24 is being inserted over the tapered periphery 72 onto the tube retainer 18 for positioning in groove 50 and to prevent snap ring 24 from slipping out of groove 50 once installed. The innermost surface 47 of the spaced tabs 48 define a circle having a smaller diameter than the diameter of ledge 74. Tabs 48 center the snap ring about the tube retainer 18 in groove 50 when the snap ring 24 is in a compressed or clasped position as shown in FIG. 2. Snap ring 24 further includes an upwardly angled tab 51. When the male connector 10 is being removed from the housing 14 for service, angled tab 51 retains the snap ring 24 within groove 50 so that snap ring 24 cannot fall off retainer 18 when unlatched for service.

The pop top 26 (FIG. 5) has a ring shaped configuration having a depth D slightly smaller than the height of the ears 44 of snap ring 24 so that the ears 44 are accessible by the conventional tools. A slot 52 is formed along an inner peripheral wall extending the entire depth D of pop top 26 for receiving ears 44. The compressed ears 44 positioned in slot 52 allows for an insertion load of the male connector into the receiving bore 16 of a force not exceeding 25 lbs. At the opposing side of the pop top 26 from the slot 52 is a breakable link 58 for purposes discussed further. The remainder portions of the pop top 26 comprise an outer ring 60 and a tapered concentric inner ring 62 having interconnecting flanges 64 therebetween. This configuration provides a structurally durable pop top 26 with minimal material. The material used for pop top 26 is preferably a 40% talc filled polypropylene.

FIGS. 2 and 7 show the male connector assembly 10 in its shipping condition to the assembly destination. For shipping, a delivery cover 66, as shown also in FIG. 6 is provided and installed on the male quick connector over the flared endform for protection to the brake line end 22 and cleanliness during shipment. The cover 66 has angularly inward flanges 68 that grip an upper surface 70 of the pop top 26. Angularly inward flanges 68 are essentially located 180° from each other on the delivery cover 66. The delivery cover 66 is also preferably manufactured from 40% talc filled polypropylene.

Upon installation at its assembly point on the vehicle, the delivery cover 66 is removed and the male quick connector 10 is inserted into a receiving bore 16 of the housing 14. As the male connector 10 is being inserted into the receiving bore 16, a lower surface 76 of pop top 26 makes contact with an upper surface 78 of the housing 14. As the male quick connector 10 is inserted further into the receiving bore 16 of housing 14 the pop top 26 moves longitudinally up tube 12 in response to the force of upper surface 78 against the pop top 26. The pop top provides a positive indicator that the male connector 10 is coupled to female connector 14. The pop top 26 may selectively remain on the brake tube 12 or can easily be snapped at the breakable link 58 and removed from tube 12.

The snap ring ears 44 slide out of slot 52 in response to the movement of the pop top 26. The ears 44 of the snap ring 24 are released from slot 52 in pop top 26 approximately 0.5 mm from the final latching position, wherein the outer periphery 80 of the snap ring 24 moves into a radial groove 82 formed in the surface of the receiving bore 16. The height dimension of the radial groove 82 coincides with the thickness dimension of outer periphery 80 so that snap ring is secured tightly within radial groove 82 and there is essentially no axial movement of the male connector 10 in the receiving bore 16. In addition, by minimizing axial movement, volumetric displacement of the connection of the male connector 10 and female connector 14 is also minimized. When snap ring 24 is in this released position and positioned in groove 82, extending ledge 75 provides a tight diametric clearance for strength holding capability of snap ring 24. The configuration of snap ring 24 positioned in groove 82 requires a retainer pull load exceeding 500 lbs to remove the male connector 10 from female connector 14.

In FIG. 1, the male connector assembly 10 is received within the receiving bore 16 of a female connector housing 14. It is understood that the housing 14 may be any connector means having a receiving bore configured with the mating surfaces and bore dimensions as shown for the proper function of the male quick connect 10. In particular, it is the intent of the inventor to provide a quick connector that is sized to replace existing tube nuts currently being used for coupling a brake line to a brake junction such as used in current brake systems. Therefore, the invention provides a male connector designed to operate with a 3/16 inch and 6 mm brake tube and having an overall length (L) of 13.6 mm.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A quick connector for high pressure fluids comprising:
a male connector portion including,
a tube having a flared end, said flared end having an endmost portion upturned into said tube; and
a tube retaining means defining a male fitting body having a central aperture for receiving said tube, said male fitting body having a cylindrical lower portion formed over the flared end of said tube to provide a secure attachment to said tube, wherein said male connector portion further includes a latching means for expanding outwardly when in a released position and compressing radially inwardly when in a clasped position.

2. The quick connector of claim 1 wherein said male connector portion further includes a positive latch indicator engaged with said latching means when said latching means is in a clasped position.

3. The quick connector of claim 2 wherein said male connector portion further includes a selectively releasable delivery cover, wherein said delivery cover is connected to the positive latch indicator when said latching means is in a clasped position.

4. The quick connector of claim 2 wherein said male fitting body has an outwardly tapered upper portion terminating to an annular ledge and having an annular groove adjacent said ledge.

5. The quick connector of claim 2 wherein said male connector portion further includes an annular seal positioned in a corresponding recess of the male fitting body.

6. The quick connector of claim 4 wherein said latching means defines a snap ring having a non-contiguous circular shape having longitudinally raised ears at each end of said snap ring.

7. The quick connector of claim 6 wherein said snap ring has radially inwardly facing tabs spaced around an inner periphery of said snap ring for centering said snap ring in the annular groove of the male body fitting when said snap ring is in a clasped position.

8. The quick connector of claim 7 wherein the longitudinally raised ears are engaged in a slot in the positive latch indicator when the latching means is in a clasped position.

9. A quick connector for high pressure fluids comprising:
a male connector portion and a female connector portion, said male connector portion including;
a tube having a flared end, said flared end having an endmost portion upturned into said tube;
a tube retaining means defining a male fitting body having a central aperture for receiving said tube, said male fitting body having a cylindrical lower portion enfolding the flared end of the tube to provide a fluid tight seal;
a latching means for expanding outwardly when in a released position and compressing radially inwardly when in a clasped position;
said female connector portion including an upper first surface and a second surface defining a receiving bore for said male connector portion, said second surface having an annular channel for receiving said latching means when said latching means is in a released position providing a fluid tight seal.

10. The quick connector of claim 9 wherein said latching means defines a snap ring having a thickness corresponding to the annular channel of the female connector portion for essentially eliminating axial movement of the male connector in the receiving bore and minimizing volumetric displacement.

11. The quick connector of claim 10 wherein said male connector further includes a positive latch indicator engaged with said latching means when said latching means is in a clasped position and longitudinally removable from said latching means in response to contact with the upper first surface.

12. The quick connector of claim 11 wherein said latching means radially expands to a released position in response to the longitudinal movement of the positive latch indicator.

13. The quick connector of claim 11 wherein said male connector portion has a selectively removable cover having locking tabs for engaging with the positive latch indicator when said latching means is in a clasped position.

14. The quick connector of claim 2 constructed by the method comprising the steps of:
flaring an end of a tube;
upturning an endmost portion of the flared end into the tube;
inserting the flared end of the tube into a male fitting body; and
deforming an end of the male fitting body to enclose the flared end.

15. A method for constructing a quick connector for high pressure fluids comprising the steps of:
flaring an end of a tube;
inserting the flared end of the tube into a male fitting body; and
deforming an end of the male fitting body to enclose the flared end;

installing a latching means over an outwardly tapered second end of the male fitting body; and positioning said latching means in an annular groove of the male fitting body.

16. The method of claim 15 further comprising the step of:

installing an annular seal in an annular recess of the male fitting body.

17. The quick connector of claim 7 wherein the male connector has an overall length less than 14 mm.

18. The quick connector of claim 11 wherein said positive latch indicator includes a breakable link for removing said positive latch indicator from said tube.

\* \* \* \* \*